United States Patent
Vehmaa et al.

(10) Patent No.: US 6,751,305 B2
(45) Date of Patent: Jun. 15, 2004

(54) SYSTEM AND METHOD FOR DEFINING ACCESS RIGHTS IN A TELECOMMUNICATIONS SWITCHING SYSTEM

(75) Inventors: Jari Vehmaa, Helsinki (FI); Anssi Järvenpää, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/982,697

(22) Filed: Oct. 17, 2001

(65) Prior Publication Data

US 2002/0057778 A1 May 16, 2002

Related U.S. Application Data

(63) Continuation of application No. PCT/FI00/00415, filed on May 9, 2000.

(30) Foreign Application Priority Data

May 10, 1999 (FI) .................................................. 991076

(51) Int. Cl.$^7$ ................................................ H04M 3/42
(52) U.S. Cl. ............................. 379/201.01; 379/93.02; 379/93.03; 379/903
(58) Field of Search .................. 379/139, 145, 379/168, 184, 188, 194, 201.01, 207.13, 93.02, 93.03, 167.06, 903; 713/183, 202

(56) References Cited

U.S. PATENT DOCUMENTS

| 4,868,736 | A | | 9/1989 | Walker |
| 5,606,663 | A | | 2/1997 | Kadooka |
| 5,655,013 | A | * | 8/1997 | Gainsboro .................. 379/188 |
| 5,708,777 | A | | 1/1998 | Sloan et al. |
| 5,734,718 | A | | 3/1998 | Prafullchandra |
| 5,764,890 | A | | 6/1998 | Glasser et al. |
| 5,864,665 | A | * | 1/1999 | Tran ........................... 713/201 |
| 6,490,687 | B1 | * | 12/2002 | Nagai ......................... 713/202 |
| 6,615,258 | B1 | * | 9/2003 | Barry et al. ................ 709/223 |

FOREIGN PATENT DOCUMENTS

GB   2 293 901   4/1996

* cited by examiner

*Primary Examiner*—Bing Bui
(74) *Attorney, Agent, or Firm*—Squire, Sanders & Dempsey L.L.P.

(57) ABSTRACT

Method and system for defining access rights in a telephone switching system comprising functions for controlling the operating system of the telephone switching system on the basis of commands entered. In the method, the right of access to the operating system is determined on the basis of a user identifier and a password associated with it. Moreover, a user profile is formed, said profile comprising one or more user identifiers and having a predetermined validity period. According to the method, a validity parameter associated with the user data is decreased on the basis of elapsed time and/or the number of log-on times and/or the weighting values of the commands entered.

19 Claims, 3 Drawing Sheets

Figure 1:
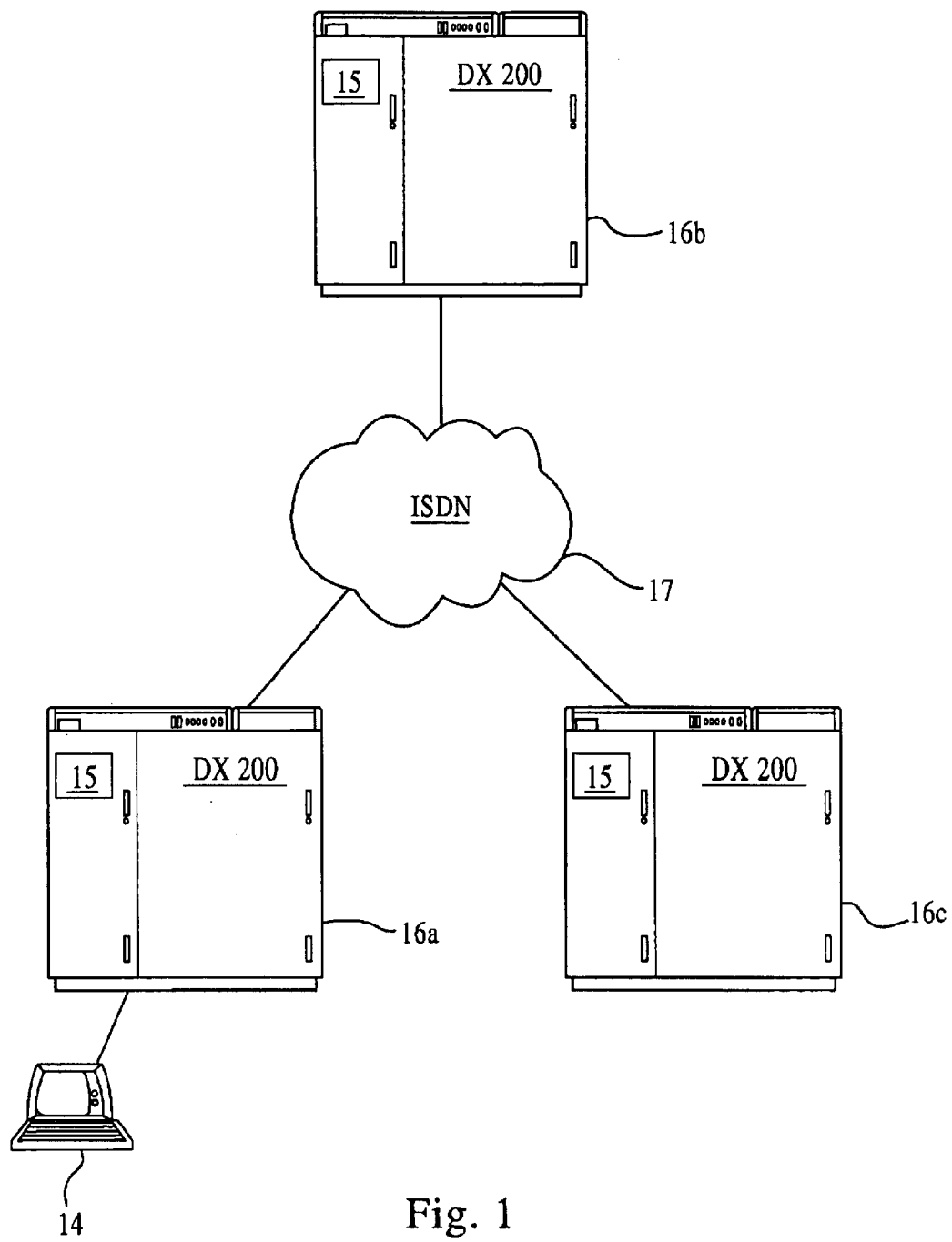

SYSTEM AND METHOD FOR DEFINING ACCESS RIGHTS IN A TELECOMMUNICATIONS SWITCHING SYSTEM

This application is a continuation of international application serial number PCT/FI00/00415, filed May 9, 2000.

FIELD OF THE INVENTION

The present invention relates to a solution for defining the rights of access to the operating system of a telephone switching system.

BACKGROUND OF THE INVENTION

In almost all multiple-access data networks, some kind of user identification method is used. Such data networks include e.g. internal networks within enterprises as well as networks used in schools and universities. Access right verification of various degrees is also often applied in conjunction with industrial equipment and control of such equipment or associated software updates. This type of systems include the operating system of a telephone switching system. Here, the operator has defined a number of users who have the right to control the operation of a switching center via its operating system.

The commonest method for user identification is to give the user a personal user identifier and a password associated with it. The password is generally not known to the maintainer of the network. If the password is stored in an encrypted form, it cannot be deciphered afterwards. The user identifier and password are typically associated with a validity period defined separately for each user identifier. At the change of the day, the validity data for each user identifier is decreased by one. When the validity period of the user identifier is reduced to zero, the user identifier becomes invalid.

A problem with the above-mentioned solution is that the validity period of user identifiers is in most cases defined in terms of complete days of use starting from the current instant and that the validity of the user identifier is not dependent on any other condition or parameter.

The object of the present invention is to eliminate the above-mentioned drawbacks or at least to significantly alleviate them.

A specific object of the invention is to disclose a new type of method and system which allow the validity period of user identifiers and/or user profiles and/or passwords in the operating system of a telephone switching system to be defined as a number of log-on times, as active session time and/or as a function of commands used.

As for the features characteristic of the present invention, reference is made to the claims.

BRIEF DESCRIPTION OF THE INVENTION

The method of the invention concerns the definition of access rights in a telephone switching system comprising functions for controlling the operating system of the telephone switching system on the basis of commands entered.

According to the invention, the right of access to the operating system is defined by means of a user identifier and an associated password. By entering his user identifier and a valid password associated with it, the user can log on into the operating system of the telephone switching system. One or more user identifiers may be grouped under the same profile. In this context, the concept of 'profile' means that all those covered by the same profile have uniform rights and user identifier validity periods and are subject to the same conditions regarding expiry of identifiers.

In the method of the invention, it is possible to define a weighting value for an operating system command. The weighting value is e.g. a number whose magnitude reflects the importance or "power" of the command used. Furthermore, the validity parameter associated with the user data is decreased on the basis of the weighting values of commands entered. In this context, 'user data' means e.g. user identifier, user profile or password. When the validity parameter associated wit the user data has been defined as a function of time, the time parameter associated with the identifier is decreased in accordance with the number of times of use. The amount of time by which the parameter is reduced is preferably the amount of time spent on each session or the elapsing time in general. A further criterion of decreasing the parameter may be the number of log-on times. Each time when the user logs on into the system, the validity parameter associated with the user data is decremented by one.

The weighting values of commands entered may also be used as a parameter for reducing the validity period associated with the user data. This is based on the idea that each command has a characteristic weighting value by which the validity parameter is decreased when the command is issued. A given weighting value corresponds e.g. to a predetermined amount of time. The validity parameter is not necessarily bound to time. Therefore, each user has an individual starting level of the validity parameter, which is reduced in accordance with the commands issued. As an example, let it be stated that a delete command probably has a higher weighting value than a print command. If the commands employed by the user mainly consist of commands having a higher weighting value, then, measured as a length of time, the validity period of the user data is shorter than in the case of lower weighting values. If the user tries to execute a command whose weighting value exceeds the value of the validity parameter, then the command will not be executed.

In the telephone switching system, it is possible to dynamically change the validity periods associated with user identifiers and/or user profiles. In this case, the validity period can be changed even if the user identifier and the associated password are still valid at the instant in question. Correspondingly, it is possible to define user identifiers and/or user profiles with an unlimited validity period.

When the validity period of the user identifier and/or user profile expires, the user identifier has no access right any longer. If the validity period of the user identifier expires while the user is having a session active, then the session is terminated and the user is notified about the identifier being outdated. Further, the telephone switching system may have a property whereby the user is given notice of future expiry of the password associated with the user identifier a predetermined length of time before the user identifier expires. For instance, the user may get a message saying that the user is entitled to five more times of log-on into the telephone switching system. If the password is already outdated when user logs on into the system next, then he will not have a right to use any other system commands except the command for changing the password.

The system of the present invention comprises means for defining a weighting value for an operating system command and means for decreasing a validity parameter associated with user data on the basis of the weighting values of commands issued. Furthermore, the system comprises means for canceling the access rights of a user identifier when the validity period of the user identifier expires, and means for changing the validity period of a user identifier and/or user profile while the user identifier and/or the user profile are/is still valid.

In a preferred embodiment of the invention, the system comprises means for terminating the session and notifying the user if the validity of the user identifier expires during an ongoing session, means for notifying the user about future expiry of validity of the user identifier in advance by a given length of time before the user identifier becomes outdated and means for defining user identifiers and/or user profiles with unlimited validity. In addition, the system comprises means for allowing log-on of the user into the telephone switching system and preventing the use of other commands except a password change command if the user's password has become outdated.

The present invention allows easier management of rights of access to a telephone switching system. Furthermore, the invention makes it possible to define user identifiers and/or user profiles with accurate validity attributes. At the same time, the security of the telephone switching system can be improved.

LIST OF ILLUSTRATIONS

Figure 2:
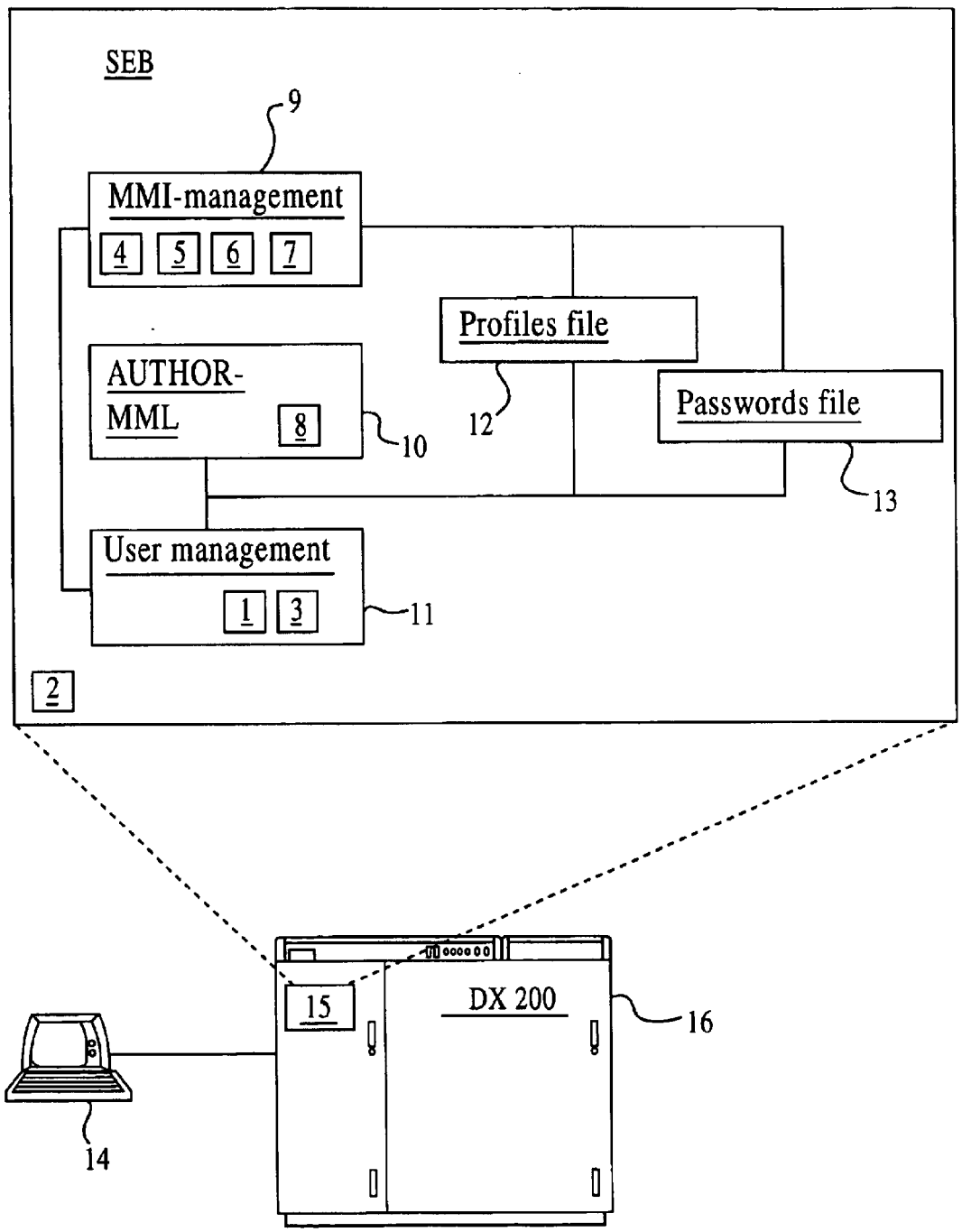
Figure 3:
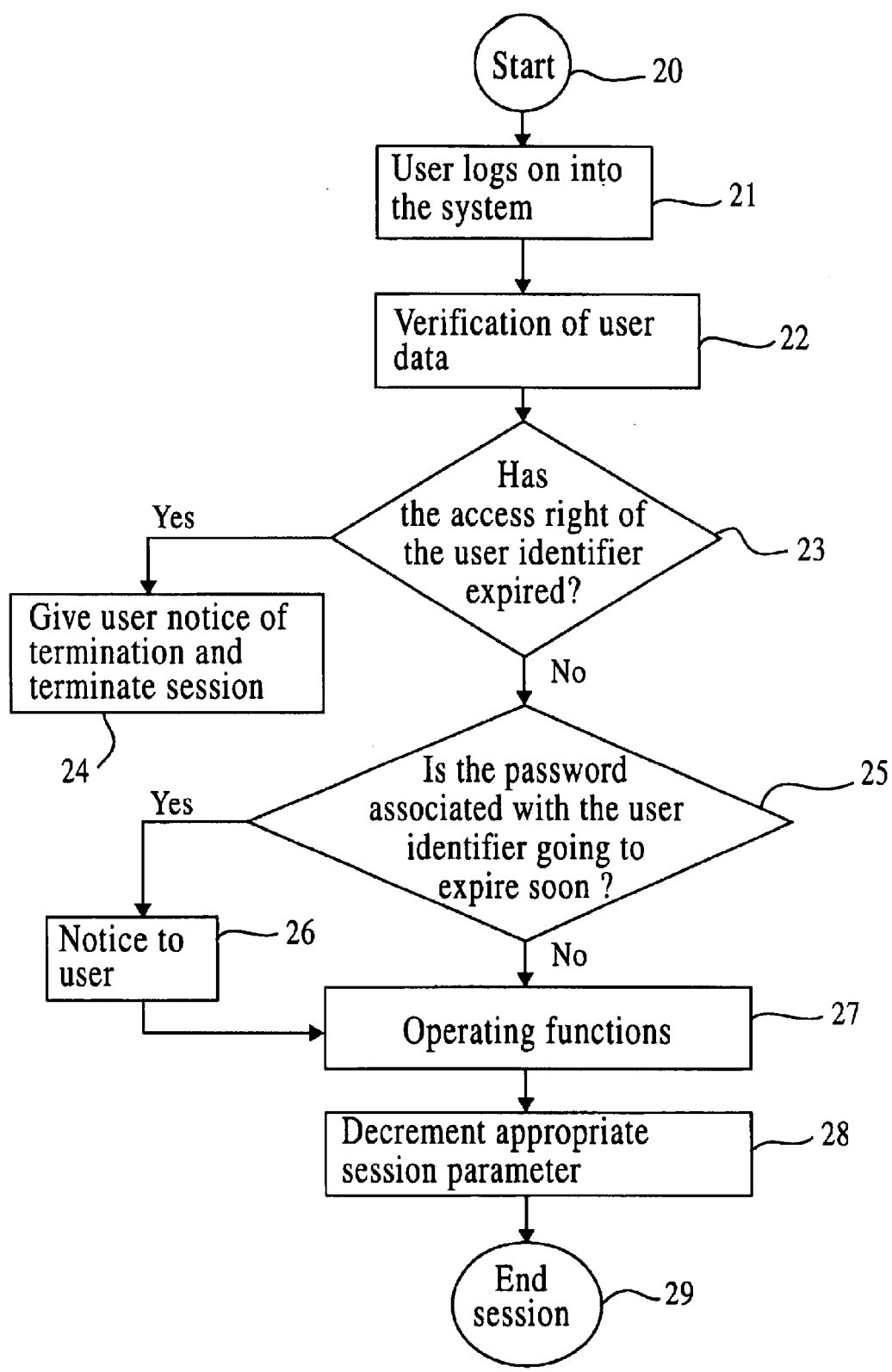

In the following, the invention will be described in detail by the aid of a few of its embodiments, wherein FIG. 1 presents a system architecture according to the invention, FIG. 2 presents a preferred system according to the invention, and FIG. 3 presents a preferred functional block diagram for a system according to the invention as illustrated in FIG. 1.

DETAILED DESCRIPTION OF THE INVENTION

The system illustrated in FIG. 1 comprises a first switching center 16a, a second switching center 16b and a third switching center 16c. The switching centers 16a, 16b and 16c are connected to each other via a telecommunication network 17. The telecommunication network 17 is e.g. an ISDN network (ISDN, Integrated Services Digital Network). The system illustrated in the figure additionally comprises a workstation 15, which is connected to the first switching center 16a. The first switching center 16a can be controlled by means of the workstation 15. In addition, it is possible to establish a remote connection from the workstation 14 to switching centers 16b and 16c via the telecommunication network 17. An essential part comprised in each switching center is a software block 15 forming part of the operating system of the telephone switching system.

The system presented in FIG. 2 comprises a telephone switching center 16. The switching center 16 comprises a software block 15, which is part of the operating system of the telephone switching system. The system also comprises a workstation 14. The software block 15 comprises a MMI (Man Machine Interface) management block 9, which acts as a software block controlling the functions of the system. These functions include the transmission of information between the workstation 14 and the switching system. The software block 15 comprises an Author-MML block 10, a user management block 11, a profiles file 12 and a passwords file 13. The user interface is implemented by Author-MML 10, which serves as a means of managing the user identifiers.

The software block 15 additionally comprises means 2 for determining the weighting value of a command given in the operating system of the switching center. These means 2 are preferably implemented as software blocks.

The profiles file 12 contains information about the existing profiles in the telephone switching system, and the passwords file contains passwords associated with the existing user identifiers. The user identifiers are managed by means of the Author-MML block 10. The functions of the user management block 11 pertain to the treatment of passwords and user identifiers and other related matters.

The MMI management block 9 comprises means 4 for allowing user log-on into the telephone switching system and preventing the use of commands other than a password change command if the user's password is outdated. The MMI management block 9 additionally comprises means 5 for changing the validity period of the user identifier and/or user profile while the user identifier and/or user profile are/is still valid, means 6 for terminating the session and notifying the user if the validity of the user identifier expires while a session is going on, and means 7 for notifying the user about future expiry of the password associated with the user identifier a given length of time before the password expires. Means 4–7 are preferably implemented as program blocks.

The Author-MML block 10 comprises means 8 for defining user identifiers and/or user profiles that will never expire. These means 8 are preferably implemented as software blocks.

The user management block 11 comprises means 1 for decreasing the validity period of the user identifier and/or user profile on the basis of the weighting values of commands entered, and means 3 for canceling the access rights of the user identifier when the validity period of the user identifier expires. Means 1 and 3 are preferably implemented as software blocks.

In an example according to FIG. 2, the user management block 11 decrements the user-specific password validity parameter found in the passwords file 13. The parameter is decremented e.g. when the user logs on into the switching system. At the beginning of the session, the MMI management block 9 sends a password verification message to the user management block 11. After this, the user management block 11 checks whether the user identifier and password are valid and sends the result in a reply to the MMI management block 9. If the user identifier and/or password are/is going to expire e.g. after five more times of log-on, then the MMI management block 9 will send a print task to the display of the workstation 14. When executing any MML command (MML, Man Machine Language), the MMI management block 9 checks whether the user's password has expired. If the password has expired and the command to be executed next is not a password change command, then a text stating that the password has expired is printed on the display of the workstation 14.

FIG. 3 is an example of a flow diagram representing the operation of a system according to the present invention. At the beginning of a session, block 20, the user logs on into the telephone switching system using his user identifier and the associated password, block 21. The operating system of the telephone switching system checks whether the user identifier in question exists, block 22, and whether the user identifier is valid, block 23. If the user's access right has expired, then the session is terminated, block 24. If an access right exists, then a further check is carried out to establish whether the expiry date of the password associated with the user identifier in question is approaching, block 25. If the password is going to expire soon, then a corresponding notice is given to the user, block 26. This notice could be given e.g. as a message appearing on the display of the user's workstation: "You have five (5) more log-on times left."

By the time the procedure reaches block 27, the validity of the user identifier has been verified and the user is free to send desired commands to the operating system. The validity of the user identifier can be determined in several different ways. In some implementations, the validity of the user identifier is measured in terms of days and therefore the validity period of the identifier is decreased by one at the change of the day. In another implementation, the validity period associated with the user identifier and/or password is decreased by a session-specific amount of time.

In this example, the validity period of the user identifier and/or password depends on the commands used. For each operating system command, a specific weighting value has been defined beforehand. Commands considered more "unsafe" reduce the validity period of the user identifier and/or password more than "safer" commands. An "unsafe" command is e.g. a delete command and a "safe" command is e.g. a print command. Thus, when commands having a high weighting value are used, the validity period of the user identifier and/or password is shorter than when commands with a lower weighting value are used. In block 28, the validity parameter for the user is decreased by an amount corresponding to the commands used. After the required commands have been executed, the session is ended, block 29.

The invention is not restricted to the examples of its embodiments described above, but many variations are possible within the scope of the inventive idea defined in the claims.

What is claimed is:

1. Method for defining access rights in a telephone switching system comprising:
    functions for controlling the operating system of the telephone switching system on the basis of the commands entered,
        said method comprising the steps of:
            determining the right of access to the operating system on the basis of a user identifier and a password associated with it;
            forming a user profile, said profile having a predetermined validity;
        wherein the method further comprises the steps of:
            decreasing a validity parameter associated with the user data on the basis of the weighting values of the commands entered.

2. Method as defined in claim 1, wherein a weighting value is defined for each operating system command.

3. Method as defined in claim 1, wherein 'user data' refers to the user identifier and/or user profile and/or password.

4. Method as claimed in claim 1, wherein the access rights of a user identifier are cancelled when the validity period of the user identifier expires.

5. Method as defined in claim 1, wherein said validity parameter associated with the user data is decreased additionally on the basis of the time that the user spends logged on or on the lapse of time in general.

6. Method as defined in claim 1, wherein
    log-on of the user into a telephone switching system is allowed; and
    the use of commands other than a password change command is prevented if the user's password has expired.

7. Method as defined in claim 1, wherein the validity period of the user identifier and/or user profile is changed while the user identifier and/or user profile are/is still valid.

8. Method as defined in claim 1, wherein the session is terminated and a corresponding notice is given to the user if the validity of the user identifier expires while a session is going on.

9. Method as defined in claim 1, wherein the user is given notice of future expiry of a password associated with the user identifier in advance by a given amount of time before the user identifier expires.

10. Method as defined in claim 1, wherein user identifiers and/or user profiles with an unlimited validity are defined.

11. Method as defined in claim 1, wherein the operating system is the operating system of a DX200 telephone switching center.

12. System for defining access rights in a telephone switching system comprising:
    functions for controlling the operating system on the basis of commands entered,
        said method comprising the steps of:
            determining the right of access to the operating system of the telephone switching system on the basis of a user identifier and a password associated with its;
            forming a user profile, said profile having a predetermined validity,
        wherein the system comprises:
            means for decrementing a validity parameter associated with the user data on the basis of the weighting values of the commands entered.

13. System as defined in claim 12, wherein the system comprises means for determining the weighting value of an operating system command.

14. System as defined in claim 12, wherein the system comprises means for canceling the access rights of a user identifier when the validity period of the user identifier expires.

15. System as defined claim 12, wherein the system comprises means for allowing user log-on into the telephone switching system and for preventing the use of commands other than a password change command if the user's password has expired.

16. System as defined in claim 12, wherein the system comprises means for changing the validity period of the user identifier and/or user profile while the user identifier and/or user profile are/is still valid.

17. System as defined in claim 12, wherein the system comprises means for terminating the session and giving notice to the user if the validity of the user identifier expires while a session is going on.

18. System as defined in claim 12, wherein the system comprises means for giving notice to the user regarding future expiry of the password associated with the user identifier in advance by a predetermined amount of time before the password expires.

19. System as defined in claim 12, wherein the system comprises means for defining user identifiers and/or user profiles having an unlimited validity period.

* * * * *